United States Patent
North, Jr.

(10) Patent No.: US 6,930,487 B2
(45) Date of Patent: Aug. 16, 2005

(54) METHOD FOR ELECTRONIC DAMPING OF ELECTROSTATIC POSITIONERS

(76) Inventor: Howard L. North, Jr., P.O. Box 390, Oldwick, NJ (US) 08858-0390

( * ) Notice: Subject to any disclaimer, the term of this patent is extended or adjusted under 35 U.S.C. 154(b) by 132 days.

(21) Appl. No.: 10/678,293

(22) Filed: Oct. 3, 2003

(65) Prior Publication Data

US 2004/0113514 A1 Jun. 17, 2004

Related U.S. Application Data

(60) Provisional application No. 60/432,959, filed on Dec. 12, 2002.

(51) Int. Cl.$^7$ .......................... G01R 23/12; H01L 41/04
(52) U.S. Cl. ...................... 324/457; 324/660; 310/317; 73/514.05; 73/514.12
(58) Field of Search ................................ 324/457, 658, 324/661, 662; 310/315, 317, 316.01, 316.02; 73/514.05, 514.11, 514.12, 514.14

(56) References Cited

U.S. PATENT DOCUMENTS

| | | | |
|---|---|---|---|
| 4,246,449 A | 1/1981 | Biber | 381/191 |
| 4,574,327 A | 3/1986 | Wilner | 361/283.4 |
| 5,170,283 A | 12/1992 | O'Brien et al. | 359/291 |
| 5,485,437 A | 1/1996 | Gregg | 369/44.14 |
| 5,521,452 A | 5/1996 | Gregg | 310/309 |
| 5,563,344 A | 10/1996 | Kaiser et al. | 73/514.24 |
| 5,578,976 A | 11/1996 | Yao | 333/262 |
| 5,905,571 A | 5/1999 | Butler et al. | 356/328 |
| 5,959,516 A | 9/1999 | Change et al. | 334/14 |
| 5,990,473 A | 11/1999 | Dickey et al. | 250/231.13 |
| 6,009,751 A | 1/2000 | Ljung | 73/504.02 |
| 6,064,126 A | 5/2000 | Beardmore | 307/112 |
| 6,232,847 B1 | 5/2001 | Marcy, 5th et al. | 331/167 |
| 6,234,607 B1 | 5/2001 | Sakai et al. | 347/54 |
| 6,246,826 B1 | 6/2001 | O'Keefe et al. | 385/140 |
| 6,359,757 B1 | 3/2002 | Mallary | 360/294.3 |
| 6,465,933 B1 | 10/2002 | North, Jr. | 310/319 |

Primary Examiner—Vincent Q. Nguyen

(57) ABSTRACT

Electronic damping may be provided to an electrostatic positioner by developing a signal proportional to the velocity of the movable positioner plate and then changing the voltage applied to the positioner in proportion to this velocity signal to oppose the velocity of the movable plate. This velocity signal is obtained by subtracting from a first voltage proportional to the total current through the positioner a second voltage proportional to the current through the static capacitance of the positioner. The first voltage is obtained by a resistor in series with the positioner. The second voltage is not obtainable directly but is equal to a third voltage synthesized by a model impedance including a capacitor and a resistor in series having the same impedance and RC time constant as that of the positioner static capacitance and the resistor in series with the positioner where both resistor and capacitance are energized by the voltage driving the positioner.

12 Claims, 1 Drawing Sheet

METHOD FOR ELECTRONIC DAMPING OF ELECTROSTATIC POSITIONERS

BACKGROUND

Figure 1:
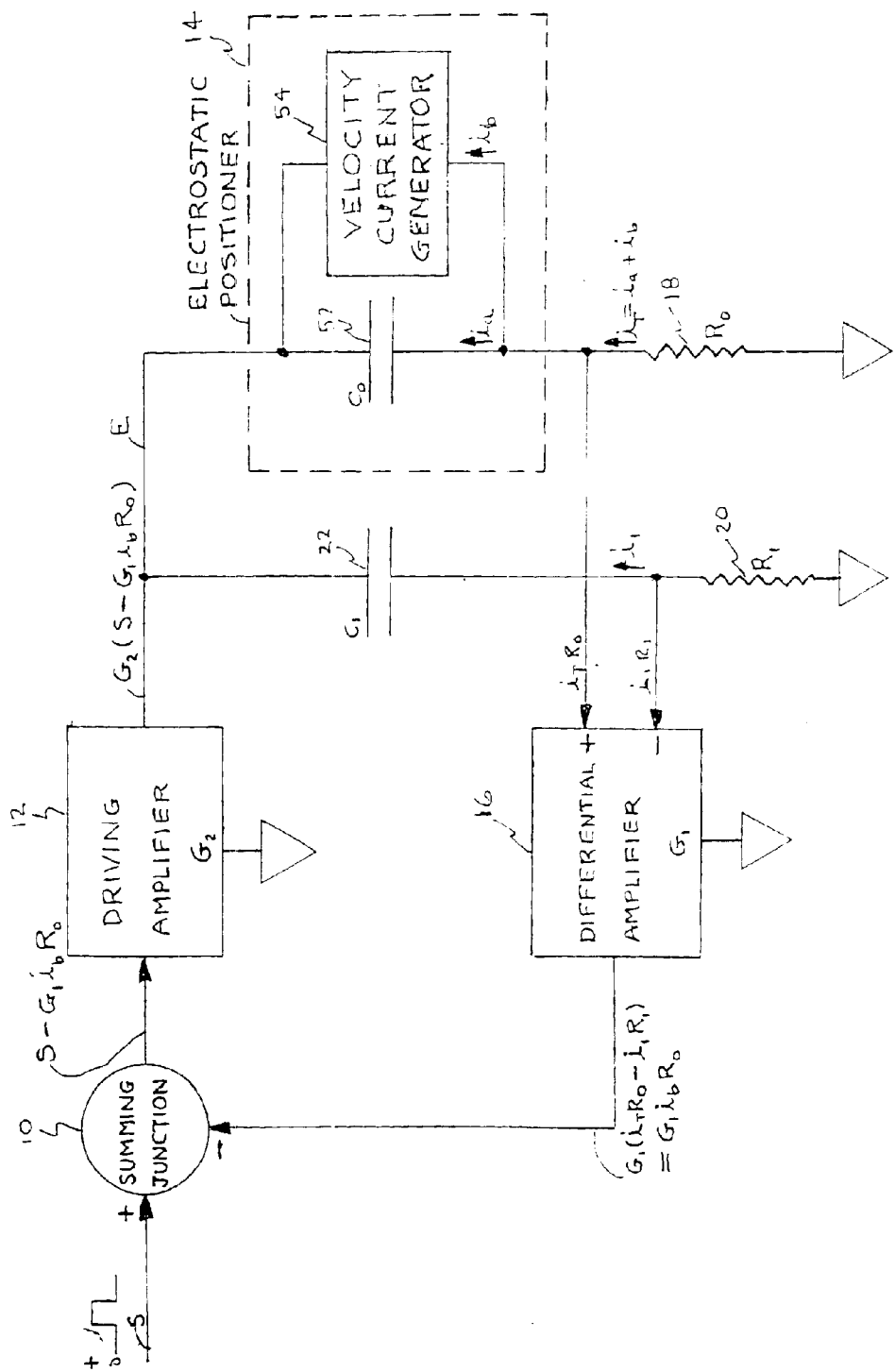

This application claims the benefits of Provisional Patent Application Ser. No. 60/432,959 filed Dec. 12, 2002.

BACKGROUND—FIELD OF INVENTION

This invention relates to electronic means to provide a velocity signal for the motion of an electrostatic positioner and the use of this velocity signal to provide electronic damping of the mechanical vibrations thereof.

BACKGROUND—DESCRIPTION OF PRIOR ART

Many positioning systems have a position response related to an applied signal voltage. In an electrostatic positioner a voltage is applied to one of two opposed plates of approximately equal area and generally parallel to each other. One plate is movable and is supported by an elastic structure. The Coulomb force generated by the applied voltage causes the movable plate to be attracted to the stationary plate. This movable plate often has less than 1% of critical damping and objectionable vibrations can be induced by sudden changes in the applied voltage or by external mechanical inputs such as vibration of the stationary structure or sonic vibrations. Approaches to reducing unwanted vibrations of piezoelectric positioners are described in U.S. Pat. No. 6,465,933 incorporated herein by reference. Most of these methods used for piezoelectric positioners can also be used for electrostatic positioners and their shortcomings are discussed in the referenced patent. Efforts to reduce these unwanted vibrations in electrostatic positioners have used the following approaches:

1. Viscous Medium

This immerses the moving plate in a viscous medium such as oil. This is useful but not always convenient and suffers from changes in damping due to changes in viscosity with temperature changes. With small plates the damping is sometimes excessive even with air as the medium. The following are examples of prior art:

U.S. Pat. No. 6,359,757 to Mallary Mar. 19, 2002 uses diffusion pump oil between plates.

U.S. Pat. No. 6,246,826 to O'Keefe et al Jun. 12, 2001 for an optical attenuator uses oil.

U.S. Pat. No. 6,232,847 to Marcy 5th et al May 15, 2001 uses squeeze film damping.

U.S. Pat. No. 6,064,126 to Beardmore May 16, 2000 for switches uses vacuum to eliminate squeeze film damping.

U.S. Pat. No. 5,959,516 to Change et al Sep. 28, 1999 modifies the structure to reduce air damping.

U.S. Pat. No. 5,905,571 to Butler et al May 18, 1999 uses nitrogen or argon under pressure to increase damping.

U.S. Pat. No. 5,578,976 to Yao Nov. 26, 1996 uses holes in a plate to reduce squeeze film damping of a MEMS RF switch.

U.S. Pat. No. 5,563,344 to Kaiser et al Oct. 8, 1996 uses vacuum to reduce viscous damping.

U.S. Pat. Nos. 5,521,452 and 5,485,437 to Gregg 1996 both use viscous liquid damping.

U.S. Pat. No. 5,170,280 to O'Brien Dec. 8, 1992 uses a hole in the stationary plate to vent gas and allow a moving membrane to move with critical damping in an electrostatic positioner.

U.S. Pat. No. 4,574,327 to Wilner Mar. 4, 1986 uses grooves in the movable plate to vent gas and provide the desired damping.

U.S. Pat. No. 4,246,449 to Biber Jan. 20, 1981 uses lands and indents on crests of projections of a stationary plate to provide optimum damping for an electrostatic transducer.

2. Driving Signal Modification

Arrange the driving signal to minimize the production of unwanted vibrations. This works well when the properties of the moving plate are well known and do not change significantly. It is of no benefit to limit vibrations induced by sources other than the input signal such as sonic or mechanical vibrations. It also limits the maximum velocity which can be produced as well as the shape and frequency ccontent of driving signals. The following are examples of prior art:

U.S. Pat. No. 6,465,933 to North Oct. 15, 2002 describes use of a trapezoidal driving signal where the rise, dwell, and fall times are equal to the period of the moving system's natural resonant frequency. Such a driving signal has no Fourier series components at the system resonant frequency.

U.S. Pat. No. 6,234,607 to Sakai et al May 22, 2001 uses a reverse pulse following a signal pulse to reduce the vibrations of a diaphragm in an ink jet head and refers to JP-A-556-161172 (1981) where residual vibration is canceled by applying a reverse signal to an electrostatic positioner. The timing and magnitude of the reverse pulse depend greatly on the system natural resonant frequency and damping which may change with ambient air temperature and pressure as well as with wear and ageing effects.

3. Plate Velocity Feedback

Develop a velocity signal for the movable plate and use this velocity signal in an electrical feedback mode to oppose the plate velocity. A velocity sensor introduces cost and space effects and may produce changes to the dynamic characteristics of the movable plate due to added mass. Applicant implements this approach by electronically sensing the velocity of the movable plate. The following are examples of prior art:

U.S. Pat. No. 6,009,751 to Ljung Jan. 4, 2000 uses a capacitive device to sense the moving plate angular velocity and then applies this signal to stationary electrodes to provide damping of the moving plate.

U.S. Pat. No. 5,990,473 to Dickey et al Nov. 23, 1999 optically senses the motion of a MEMS device. The sensor measures the position of the moving plate by sensing light reflected from a corrugated surface of the moving plate. The resulting signal can be differentiated with respect to time to obtain a velocity signal which can then be used in a feedback control to produce the effect of damping.

OBJECTS AND ADVANTAGES

Accordingly, several objects and advantages of my invention are:

(a) to provide damping to electrostatic positioners by electronic means thereby permitting rapid position changes with little or no overshoot or oscillation of position.

(b) to provide electronic damping to an electrostatic positioner without requiring the use of a velocity sensor or position sensor.

(c) to provide electronic damping to an electrostatic positioner which may be completely implemented by a few simple low cost components such as capacitors, resistors, and amplifiers.

(d) to provide electronic damping to an electrostatic positioner the design of which requires no knowledge of the natural frequency of oscillation of the positioner and its load.

(e) to provide electronic damping to an electrostatic positioner which is unaffected by changes in the natural frequency of oscillation of the positioner and its attached load.

(f) to provide electronic damping to an electrostatic positioner whereby the damping can be easily adjusted by resetting one or two potentiometers in the electronic damping circuit.

(g) to provide electronic damping to an electrostatic positioner and its load of up to critical damping or more and thereby provide greatly increased resistance to disturbances in position caused by external vibrations whereby the need for vibration isolating means and its associated cost may be reduced or eliminated.

(h) to provide electronic damping to an electrostatic positioner and its load of up to critical damping or more thereby removing restrictions on the shape of the driving waveform and permit rapid position changes without overshoots or poorly damped oscillations of position.

(i) to provide electronic damping to an electrostatic positioner and its load and thereby reduce or eliminate an undesireable first order position resonance.

(j) to provide electronic damping to an electrostatic positioner and its load which may either add to the positioner damping or reduce the positioner damping depending on the sign of a feedback signal.

Further objects and advantages are to provide electronic damping to an electrostatic positioner which can be easily designed and manufactured, which is easy to use, which is inexpensive, which is easily incorporated into new driving circuit designs, and which is easily added to existing circuit hardware, which can tolerate changes in positioner dynamic characteristics without loss of damping performance, and which can significantly increase the ability of an electrostatic positioner to move a load from one position to another rapidly and stably without objectionable overshoots or oscillations of position.

Still further objects and advantages will become apparent from a consideration of the ensuing description and drawing.

DRAWING FIGURES

FIG. 1 Simplified Electrical Schematic of the Closed Loop Velocity Feedback Control

LIST OF REFERENCE NUMERALS

Numeral Description
10 Summing junction
12 Driving amplifier
14 Electrostatic positioner
16 Differential amplifier
18 Current sensing resistor—$R_o$
20 Current sensing resistor—$R_1$
22 Capacitor—$C_1$
52 Positioner static capacitance—$C_0$
54 Velocity current generator

SUMMARY OF THE INVENTION

Electronic damping is provided to an electrostatic positioner by negative feedback of a positioner velocity signal derived from a measurement of the total current passing through the positioner. This total current is the sum of a first current due to the changing voltage on the positioner capacitance and a second current due to the velocity of the positioner plate separation. This second current is obtained by subtracting the first current from the total current and is used as a velocity feedback signal to either increase or decrease the positioner damping depending on the sign of the feedback signal. This first current is not measured directly but is obtained from a model of the positioner static capacitance and current sensor series impedance.

DESCRIPTION—MAIN EMBODIMENT

Referring to FIG. 1 the electrostatic positioner 14 is represented by capacitor 52 and velocity generator 54. The output of driving amplifier 12 drives electrostatic positioner 14 and current sensing resistor 18 in series. A capacitor 22 in series with a resistor 20 is connected to the output of driving amplifier 12. The voltages across resistors 18 and 20 are inputs to differential amplifier 16 having a gain $G_1$ whose output is input to summing junction 10. The driving signal s is also input to summing junction 10. The output of summing junction 10 is input to driving amplifier 12 having gain $G_2$.

OPERATION—MAIN EMBODIMENT

The following is a description of how the invention develops a voltage proportional to the velocity of separation of the plates of an electrostatic positioner.

The charge on an electrostatic positioner is $Q=CE$      Eq.1 where Q is the positioner charge in coulombs, C is the positioner capacitance in farads, and E is the voltage across the positioner plates.

The current into a capacitor is $I=dQ/dt$      Eq.2 where I is the current in amperes and dQ/dt is the change in charge in coulombs/second.

When Eq.1 is differentiated with respect to time the result is:

$$dQ/dt = CdE/dt + EdC/dt \qquad \text{Eq.3}$$

Combining Eq.2 and Eq.3 the result is:

$$I = CdE/dt + EdC/dt \qquad \text{Eq.4}$$

Eq.4 shows that the total current, $I_T$, is the sum of two currents. The first current $i_a = CdE/dt$ is that due to changing voltage. The second current $i_b = EdC/dt$ is that due to changing capacitance and is related to the velocity of plate separation.

Thus Eq.4 can be rewritten as $I_T = i_a + i_b$      Eq.5

When Eq.5 is multiplied by $R_0$ the result is:

$$I_T R_0 = i_a R_0 + i_b R_0 \qquad \text{Eq.6}$$

$I_T R_0$ is the voltage across $R_0$. If $i_a R_0$ can be determined then $i_b R_0$ can be found by subtracting $i_a R_0$ from $I_T R_0$ or:

$$i_b R_0 = I_T R_0 - i_a R_0 \qquad \text{Eq.7}$$

The problem is that $i_a R_0$ cannot be found directly. However, $i_a$ is found from $$i_a = E/Z_0 \qquad \text{Eq.8}$$

where $Z_0$ is the impedance of $C_0$ and $R_0$ in series. Thus $$Z_0 = (1 + j\omega R_0 C_0)/j\omega C_0 \qquad \text{Eq.9}$$

Combining Eq.8 and Eq.9 the result is:

$$i_a = Ej\omega C_0/(1+j\omega R_0 C_0) \quad \text{Eq.10}$$

Eq.10 multiplied by $R_0$ is: $i_a R_0 = Ej\omega R_0 C_0/(1+j\omega R_0 C_0)$ Eq.11

By providing $R_{20}$ and $C_{22}$ in series across E where $R_1 C_1 = R_0 C_0$ the voltage across $R_1$ will be the same as the voltage across $R_0$ due to $i_a$ and can be used in place of $i_a R_0$ in Eq.7 to find $i_b R_0$. Proof of this follows from a calculation of $i_1 R_1$.

The current $i_1 = E/Z_1$     Eq.12 and $Z_1 = (1+j\omega R_1 C_1)/j\omega C_1$     Eq.13

From Eq.12 and Eq.13 $i_1 = Ej\omega C_1/(1+j\omega R_1 C_1)$     Eq.14

Eq.14 multiplied by $R_1$ is $i_1 R_1 = Ej\omega R_1 C_1/(1+j\omega R_1 C_1)$     Eq.15

Comparing Eq.11 and Eq.15 it is clear that when $R_1 C_1 = R_0 C_0$ $$i_1 R_1 = i_a R_0 \quad \text{Eq.16}$$

Substituting $i_1 R_1$ for $i_a R_0$ in Eq.7 the result is:

$$i_b R_0 = I_T R_0 = i_1 R_1 \quad \text{Eq.17}$$

The differential amplifier 16 subtracts the voltage across $R_1$, $i_1 R_1$, from the voltage across $R_0$, $I_T R_0$, and amplifies the difference by the gain factor $G_1$ to produce $G_1 i_b R_o$ at its output. That $i_b$ is a velocity signal for the moving plate of an electrostatic positioner is clear from the following analysis. This analysis is based on an electrostatic positioner consisting of two parallel plates of equal area A in square meters separated by a spacing of r meters with one plate moving and the other plate stationary. The capacitance of this positioner is given by:

$$C = A(8.842 \times 10^{-16})/r \quad \text{Eq.18}$$

where C is in farads and the dielectric constant is 1.000 for air. Differentiating Eq.18 with respect to time the result is:

$$dC/dt = -A(8.842 \times 10^{-16})(dr/dt)/r^2 \quad \text{Eq.19}$$

Substituting this value for $dC/dt$ in $i_b = EdC/dt$ the result is:

$$i_b = -EA(8.842 \times 10^{-16})(dr/dt)/r^2 \quad \text{Eq.20}$$

Eq.20 shows that $i_b$ is directly proportional to $dr/dt$ which is the velocity of the movable plate. Thus $i_b$ is the desired plate velocity signal needed for providing electronic damping of the moving plate.

The analysis is now directed to the forces on the movable plate and the motion resulting therefrom. The two electrically conductive plates are attracted to each other by Coulomb forces when the plates are oppositely charges electrically and are repelled from each other when the plates are similarly charged electrically. These plates usually consist of one stationary plate and one movable plate supported by one or more springs attached to a stationary structure. When a charge is applied to one plate but not to the other plate the other plate's proximal surface is equally and oppositely charged and its distal surface is equally and similarly charged by the principle of electrostatic induction. The resulting attractive force between the two plates is given by:

$$F = aQ_1 Q_2/r^2 \quad \text{Eq.21}$$

Where F is the force in newtons, $Q_1$ and $Q_2$ are in coulombs, r is the plate separation in meters, and $a = 8.985 \times 10^9$ newton meters$^2$/coulomb$^2$ for air and proportional to the dielectric constant of the medium between the plates. With plates of the same area the charge $Q_1 = Q_2 = CE$ per Eq.1 and the force is:

$$F = aC^2 E^2/r^2 \quad \text{Eq.22}$$

The differential equation for the forces on the movable plate is:

$$Md^2r/dt^2 + Ddr/dt + K_T(r-r_0) = -F = -aC^2 E^2/r^2 \quad \text{Eq.23}$$

where M is the movable plate mass in kilograms, D is the damping coefficient of the movable plate in newton seconds/meter, $K_T$ is the total system spring rate of the movable plate support in newtons/meter, and $r_0$ is the separation of the plates at rest when E=0. $K_T$ is the sum of the mechanical spring rate $K_m$ of the supporting spring(s) for the movable plate and the electrical spring rate $K_e$ where $K_e$ is found by differentiating F with respect to r in Eq.22. The result is:

$$K_e = dF/dr = -2aC^2 E^2/r^3 \quad \text{Eq.24}$$

Thus $K_T = K_m - 2aC^2 E^2/r^3$     Eq.25

When the applied voltage, E, in Eq.23 is modified by a feedback signal proportional to the current due to the movable plate velocity, $dr/dt$, the result is a change in the plate damping which may be either an increase or a decrease in the damping depending on the sign of the feedback signal. FIG. 1 is a simplified schematic diagram of such a velocity feedback control which increases damping. When the plates are separating and $dr/dt$ is positive the sign of $i_b$ is negative according to Eq.20 and the output of differential amplifier 16, $G_1 i_b R_0$, is also negative and therefore must be subtracted from the driving signal s to increase the voltage $(s - G_1 i_b R_0)$ which is amplified by driving amplifier 12 with gain $G_2$ and then applied to electrostatic positioner 14 to increase the force of attraction between the two plates. This increased force of attraction opposes the separation velocity and thereby increases damping of the movable plate.

The voltage applied to the electrostatic positioner in FIG. 1 is:

$$E = G_2(s - G_1 i_b R_0) \quad \text{Eq.26}$$

DEGREE OF DAMPING PRODUCED BY THE INVENTION

When the equation of forces of Eq.23 is rewritten with the value of E from Eq.26 the result is:

$$Md^2r/dt^2 + Ddr/dt + K_T(r-r_0) = -a(CG_2/r)^2 (s - G_1 i_b R_0)^2 \quad \text{Eq.27}$$

Substituting the value of $i_b$ from Eq.20 the result is:

$$Md^2r/dt^2 + Ddr/dt + K_T(r-r_0) = -a(CG_2/r)^2 (s + G_1 R_0 E 8.842 \times 10^{-16} A r^{-2} dr/dt)^2 \quad \text{Eq.28}$$

To simplify Eq.28 let $H = a(CG_2/r)^2$     Eq.29 and $J = G_1 R_0 E 8.842 \times 10^{-16} A r^{-2}$     Eq.30

Then Eq.28 becomes:

$$Md^2r/dt^2 + Ddr/dt + K_T(r-r_0) = -H(s + Jdr/dt)^2 \quad \text{Eq.31}$$

Expanding the right side of Eq.31 and rearranging like terms:

$$Md^2r/dt^2 + (D+2HJs)dr/dt + K_T(r-r_0) = -Hs^2 - HJ^2 (dr/dt)^2 \quad \text{Eq.32}$$

From Eq.32 it is clear that the electrostatic positioner damping has been increased from D to (D+2HJs). Critical damping is when:

$$D + 2HJs = 2\sqrt{MK_T} \quad \text{Eq.33}$$

The term $-HJ^2(dr/dt)^2$ increases the driving signal $-Hs^2$ and tends to make the response somewhat faster which may be desireable. For relatively small velocities this $-HJ^2(dr/dt)^2$ term tends to be negligible.

Additional Design Considerations

From Eq.32 it is clear that the added damping, 2HJs, becomes zero when E becomes zero. This is because there can be no $i_b$ current to indicate plate velocity when there is no voltage across the plates.

It should be noted that the change in position of the movable plate is the same whether the applied voltage is positive or negative since the force is proportional to the voltage squared per Eq.22. However, the damping provided by the scheme of FIG. 1 is positive for positive E and negative for negative E. Thus the sign of the $G_1i_bR_0$ input to the summing junction must always be opposite to the sign of E for positive damping.

While the descriptions set forth herein apply only to a linear system they do apply to the actual system with small motions. The function of the invention is the same with larger motions of the movable plate but due to the non-linearities of F due to the $E^2$ and $r^2$ terms in Eq.22 and the non-linearities of $i_b$ due to the $r^2$ term in Eq.20 any calculations must take these non-linearities into account.

Implementation of the method of the invention in accordance with FIG. 1 and the description herein can be accomplished by those skilled in the art. One implementation of a similar method uses operational amplifiers and is shown in FIG. 5 of U.S. Pat. No. 6,465,933 for use with a piezoelectric positioner. However, the following considerations may be helpful.

The selection of the value of $R_0$ must satisfy two conflicting desires. One is to make $R_0$ large to get a large voltage signal $I_TR_0$. The other is to make $R_0$ small so the time constant $R_0C_0$ will allow fully charging and discharging capacitor $C_0$ at the frequencies up to the highest frequency desired for the driving signal s. Additionally, $R_0C_0$ should allow good measurement of $i_b$ at the natural resonant frequency of the movable plate in order to provide significant damping at resonance.

Once $R_0$ is selected the $R_0C_0$ time constant is determined which also sets the $R_1C_1$ time constant. It may be desireable to make $C_1=C_0$ and $R_1=R_0$ when the shunting capacitance at the + and input − terminals to differential amplifier 16 are identical. Thus $R_1$, $C_1$, and the shunting capacitance at the—terminal together will present an impedance to E which exactly matches the impedance of $R_0$, $C_0$, and the shunting capacitance at the + terminal together. Then Eq.17 will be true.

This analysis assumes a high input resistance to differential amplifier 16 which is normally true. When the + and − input terminal capacitances of amplifier 16 are not identical they can be made to be identical by adding capacitance to the terminal with the smaller capacitance.

Description and Operation—Alternative Embodiment

It is clear that when the output voltage, E, of driving amplifier 12 is constant there is no voltage generated across resistor 20. For this condition resistor 20 and capacitor 22 could be removed from the circuit shown on FIG. 1 and there would still be a voltage generated across resistor 18 due to current $i_b$ when there is a velocity of the movable plate and there is a voltage E present. This effect is present whenever there is a steady voltage E and after a transient change in voltage E. Thus damping of the movable plate would still be present and would be effective to dampen vibrations induced by external mechanical or sonic vibrations or by previously applied changes in voltage E. However, the added damping would not be as effective as with $R_1C_1$ present during transient changes in voltage E and thus would not be as effective in reducing or eliminating overshoots of position.

With resistor 20 and capacitor 22 removed from the circuit of FIG. 1 there would still be a negative feedback of current $i_b$ which would tend to reduce the voltage E driving the electrostatic positioner 14. The net effect would be the same as increasing the value of resistor 18 by the loop gain $G_1G_2$ and eliminating the negative feedback. Thus the time constant $R_0C_0$ would be increased to $G_1G_2R_0C_0$ with negative feedback and without capacitor 22 and resistor 20 in the circuit of FIG. 1. This may be desireable in some cases since it reduces the current ,$i_a$, due to sudden changes in the driving voltage E. Transient position changes tend to be less rapid.

From the foregoing it follows that when the time constants $R_0C_0$ and $R_1C_1$ are not exactly equal there can be a feedback effect of the current $i_a$. When $R_1C_1$ is smaller than $R_0C_0$ the effect of $i_a$ is to decrease the apparent value of $R_2$.

The alternative embodiments thus consist of the following used individually or in combination:

(a) Making $R_1C_1$ time constant larger or smaller than $R_0C_0$.

(b) Eliminating resistor 20, $R_1$, and capacitor 22, $C_1$.

Conclusions, Ramifications, and Scope

Accordingly, the reader will see that damping can be provided to an electrostatic positioner by simple electronic means to suppress any unwanted oscillations induced by driving electrical signals or by external vibrations. The electronic means requires no position or velocity sensors. Furthermore, the electronic means for providing damping to electrostatic positioners has the added advantage that:

it permits a freer choice of the waveforms driving an electrostatic positioner;

it permits easy adjustment of the degree of damping added to an electrostatic positioner;

it provides added damping to an electrostatic positioner which is not dependent upon the mechanical resonance frequency of the electrostatic positioner;

it provides added damping to an electrostatic positioner which can reduce or eliminate the need for vibration isolators;

it provides added damping to an electrostatic positioner which can permit faster movement from one position to another position without objectionable overshoots or oscillation of the final position;

it provides added damping to an electrostatic positioner which can be implemented by two operational amplifiers, one capacitor, and a few resistors;

it provides added damping to an electrostatic positioner which is not affected by ageing, wear, or changes in ambient temperature;

it provides added damping to an electrostatic positioner which is low cost, simple, and reliable.

Although the description above contains many specificities, these should not be construed as limiting the scope of the invention but as merely providing illustrations of some of the preferred embodiments of this invention. For example, the analog computations could be performed by digital means; analog amplifiers could be replaced by magnetic amplifiers, pulse width modulation amplifiers, or other amplifiers known to those skilled in the art; currents could be sensed by Hall effect devices sensing the current directly or sensing the magnetic field in a wire carrying the current;

the summing junction could be placed after the driving amplifier instead of before it.

Thus the scope of the invention should be determined by the appended claims and their legal equivalents, rather than by the examples given.

I claim:

1. A method of adding damping to an electrostatic positioner by electronic means comprising the steps of:
   (a) applying a control voltage driving said electrostatic positioner to control a physical position of said electroctatic positioner, and
   (b) producing a first voltage proportional to the total current passing through said electrostatic positioner in response to said control voltage, and
   (c) producing a second voltage proportional to the current passing through the static capacitance of said electrostatic positioner, and
   (d) subtracting said second voltage from said first voltage to produce a third voltage proportional to the current produced by the velocity of the moving plate of said electrostatic positioner, and
   (e) amplifying or attenuating said third voltage to obtain the desired degree of damping, and
   (f) applying said amplified or attenuated third voltage to increase said control voltage when said movable plate is moving away from the stationary plate, whereby a negative feedback effect is produced that inhibits the velocity of said movable plate thereby producing the effect of damping added to said electrostatic positioner by electronic means.

2. The method for adding damping to an electrostatic positioner by electronic means of claim 1 wherein the proportionality of said first voltage to current and the proportionality of said second voltage to current are substantially identical.

3. The method for adding damping to an electrostatic positioner by electronic means of claim 1 wherein the said first voltage is produced by a first resistor in series with said electrostatic positioner, wherein this combination in series is connected to said control voltage.

4. The method for adding damping to an electrostatic positioner by electronic means of claim 1 wherein said second voltage is produced by a second resistor in series with a second capacitance wherein said second resistor and said second capacitance have an RC time constant substantially equal to the RC time constant of said first resistor in series with said electrostatic positioner static capacitance and wherein said second resistor and said second capacitance in series are connected to said control voltage.

5. A method of adding damping to an electrostatic positioner by electronic means comprising the steps of:
   (a) applying a control voltage to said electrostatic positioner to control a physical position of said electroctatic positioner, and
   (b) producing a first voltage proportional to the total current passing through said electrostatic positioner in response to said control voltage, and
   (c) amplifying or attenuating and first voltage to obtain the desired degree of damping, and
   (d) applying said amplified or attenuated first voltage to increase said control voltage when the movable plate is is moving away from the stationary plate, whereby a negative feedback effect is produced that inhibits the velocity of said movable plate thereby producing the effect of damping added to the electrostatic positioner by electronic means.

6. A circuit for producing an electrostatic velocity signal comprising:
   (a) means for measuring the total current through said electrostatic positioner and producing a first signal proportional to said total current, and
   (b) means for modeling the current through the static capacitance of said electrostatic positioner and producing a second signal proportional to said current through said static capacitance of said electrostatic positioner wherein the proportionality of said first signal to current and the proportionality of said second signal to current are substantially identical, and
   (c) means for subtracting said second signal from said first signal to produce a difference signal proportional to the current generated by the velocity of said electrostatic positioner movable plate and therefore proportional to said moving plate velocity.

7. The circuit for producing the electrostatic positioner velocity signal of claim 6 wherein the means for measuring said total current through said electrostatic positioner is the voltage developed across a resistor in series with said electrostatic positioner.

8. The circuit for producing the electrostatic positioner velocity signal of claim 6 wherein the means for modeling said current through said static capacitance of said electrostatic positioner comprises a first combination of a first resistor and a first capacitor connected in series and driven by the same voltage driving a second combination comprising said electrostatic positioner static capacitance connected in series with a second resistor wherein said first combination has an RC time constant of a predetermined value substantially identical to the RC time constant of said second combination, whereby the voltage signals developed across said first resistor and said second resistor are substantially identical for all significant operating frequencies of said driving voltage.

9. An apparatus for control of an electrostatic positioner comprising:
   (a) control means for generating a control signal to drive an electrostatic positioner to a commanded position wherein said control means includes means for modifying said control signal in response to an electrostatic positioner velocity signal, and
   (b) computing means for synthesizing said electrostatic positioner velocity signal comprising subtracting means to subtract from a first signal for the total current passing through through said electrostatic positioner static capacitance thereby producing a third signal which is said electrostatic positioner velocity signal, and
   (c) synthesizing means for producing said second signal comprising measuring means to measure the current through a model impedance driven by said control voltage signal wherein said model impedance has attenuation and phase characteristics substantially identical to those for said electrostatic positioner static capacitance and any impedance in series therewith, and
   (d) amplifying or attenuating means to modify said third signal to obtain the desired degree of damping of said electrostatic positioner, and
   (e) applying said amplified or attenuated third signal to increase said control signal voltage when said movable plate is moving away from the stationary plate, whereby a negative feedback effect is produced that inhibits the velocity of said movable plate thereby producing the effect of damping added to said electrostatic positioner.

10. The apparatus for control of an electrostatic positioner of claim 9 wherein said model impedance comprises a first capacitor and a first resistor in series and wherein said second signal ia derived from the voltage developed across said first resistor and wherein said impedance in series with said electrostatic positioner is a resistor.

11. The apparatus for control of an electrostatic positioner of claim 9 wherein said first signal is derived from the voltage developed across a resistor in series with said electrostatic positioner.

12. The apparatus for control of an electrostatic positioner of claim 9 wherein said first signal is derived from a Hall effect device sensing total current through said electrostatic positioner.

* * * * *